(12) United States Patent
Nohara et al.

(10) Patent No.: US 9,840,214 B2
(45) Date of Patent: Dec. 12, 2017

(54) FUSE CIRCUIT BODY FOR VEHICLE

(71) Applicant: YAZAKI CORPORATION, Minato-ku, Tokyo (JP)

(72) Inventors: Mami Nohara, Shizuoka (JP); Masayoshi Yamazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 369 days.

(21) Appl. No.: 14/616,087

(22) Filed: Feb. 6, 2015

(65) Prior Publication Data

US 2015/0151697 A1    Jun. 4, 2015

Related U.S. Application Data

(63) Continuation of application No. PCT/JP2013/070426, filed on Jul. 29, 2013.

(30) Foreign Application Priority Data

Aug. 10, 2012 (JP) ................. 2012-177878

(51) Int. Cl.
*H02H 7/18* (2006.01)
*B60R 16/033* (2006.01)
(Continued)

(52) U.S. Cl.
CPC ........ *B60R 16/033* (2013.01); *B60R 16/0238* (2013.01); *H01H 85/143* (2013.01); *F02N 11/0866* (2013.01)

(58) Field of Classification Search
CPC .................................................. B60R 16/033
See application file for complete search history.

(56) References Cited

U.S. PATENT DOCUMENTS 5,602,459 A  *  2/1997  Rogers ............... B60L 11/1861
                                                  320/134
2011/0228916 A1* 9/2011 Spiridellis ......... H04M 3/53366
                                                  379/88.13

FOREIGN PATENT DOCUMENTS

JP     2008-309042 A    12/2008
JP     2010-170822 A     8/2010
(Continued)

OTHER PUBLICATIONS

Japanese Office Action dated Dec. 6, 2016 in the counterpart Japanese patent application.

(Continued)

*Primary Examiner* — Daniel Puentes
(74) *Attorney, Agent, or Firm* — Metrolexis Law Group, PLLC

(57) ABSTRACT

In a fuse circuit body according to an embodiment, electricity generated by an alternator is supplied to a first battery from an alternator connecting portion via a first fusible portion and a first battery connecting portion and supplied to a second battery from the alternator connecting portion via a second fusible portion and a second battery connecting portion. Thus, the electricity from the alternator is supplied to the first battery only via the first fusible portion and supplied to the second battery only via the second fusible portion. Accordingly, the electricity supplied from the alternator to the first battery or the second battery is not required to pass through two fusible portions so that the electricity can be supplied to the first battery and the second battery with a small loss.

11 Claims, 2 Drawing Sheets

(51) Int. Cl.
*B60R 16/023* (2006.01)
*H01H 85/143* (2006.01)
*F02N 11/08* (2006.01)

(56) References Cited

FOREIGN PATENT DOCUMENTS

| | | |
|---|---|---|
| JP | 2011-070900 A | 4/2011 |
| JP | 2011-086510 A | 4/2011 |

OTHER PUBLICATIONS

Japanese Office Action dated Jun. 28, 2016 in the counterpart Japanese patent application.

\* cited by examiner

FUSE CIRCUIT BODY FOR VEHICLE

CROSS REFERENCE TO RELATED APPLICATIONS

This application is a continuation of International Application No. PCT/JP2013/070426, filed Jul. 29, 2013, and based upon and claims the benefit of priority from Japanese Patent Application No. 2012-177878, filed Aug. 10, 2012, the entire contents of all of which are incorporated herein by reference.

TECHNICAL FIELD

This application relates to a fuse circuit body for a vehicle on which a battery for a starter motor is additionally mounted to achieve idle reduction.

BACKGROUND

An example of measures to reduce global environmental loads is an idle reduction system to stop an engine when a vehicle comes to a stop. The vehicle employing such an idle reduction system is required to reliably start the engine with a starter motor when the vehicle, which is stopping, restarts to drive. Thus, the vehicle employing the idle reduction system may be additionally equipped with a battery for driving the starter motor in addition to a battery for supplying electricity to regular loads.

Here, in a vehicle only equipped with a battery for loads, the battery is connected with an alternator and loads via a fuse unit attached to a battery post. In particular, a busbar of the fuse unit is directly attached to the battery post, and one of connecting portions of the busbar is connected with the alternator and other connecting portions are connected with loads, each connecting portion being connected via an individual fusible portion (fuse).

The one connecting portion connected with the alternator is connected with a connecting portion via a fusible portion. The coupled portion is connected with a load to which electricity is supplied from the alternator when the alternator is generating electricity (refer to JP 2011-086510 A).

SUMMARY

When a battery for driving a starter motor is additionally mounted on the vehicle using the fuse unit described above, the battery for driving the starter motor is connected to one of the other connecting portions. The battery for driving the starter motor is charged with the electricity that the alternator has generated in the same manner as the battery for loads. The electricity from the one connecting portion via the fusible body passes through the busbar and further reaches the other connecting portion via the other fusible body so as to be supplied to the battery for driving the starter motor connected to the other connecting portion.

As described above, the electricity from the alternator reaches the battery for driving the starter motor via two fusible bodies, which leads to an increase in loss accordingly.

The present invention has been made in view of the above-described problem. An object of the present invention is to provide a fuse circuit body for a vehicle capable of supplying electricity, with a small loss, from an alternator to a battery for a starter motor additionally mounted on the vehicle to achieve idle reduction.

For achieving the above-mentioned object, there is provided a fuse circuit body for a vehicle according to a first aspect of the present invention equipped with a first battery and a second battery each charged with electricity generated by an alternator when an engine is being driven, the first battery for supplying the electricity to a load, the second battery for supplying electricity to the starter motor for restarting the engine being stopped when the alternator is not generating electricity. The fuse circuit body includes: an alternator connecting portion connected with the alternator; a first fusible portion connected to the alternator connecting portion; a first battery connecting portion connected to the alternator connecting portion via the first fusible portion and connected with the first battery; a second fusible portion connected to the alternator connecting portion; a second battery connecting portion connected to the alternator connecting portion via the second fusible portion and connected with the second battery; a third fusible portion connected to the first battery connecting portion; and a load connecting portion connected to the first battery connecting portion via the third fusible portion and connected with the load.

With such a configuration, the electricity generated by the alternator is supplied to the first battery from the alternator connecting portion via the first fusible portion and the first battery connecting portion and supplied to the second battery from the alternator connecting portion via the second fusible portion and the second battery connecting portion.

The electricity from the alternator is supplied to the first battery only via the first fusible portion and supplied to the second battery only via the second fusible portion. Thus, the electricity from the alternator is not required to pass through two fusible portions when being supplied to the first battery or the second battery so that the electricity from the alternator can be supplied to the first battery and the second battery with a small loss.

The fuse circuit body according to the first aspect of the present invention preferably further includes a circuit body housing including: an insulating first body housing the alternator connecting portion, the first battery connecting portion and the second battery connecting portion at least in such a manner as to be exposed outward; and an insulating second body housing the load connecting portion and the third fusible portion at least in such a manner as to be exposed outward. The circuit body housing is preferably attached to the first battery or the second battery in a manner such that the first body extends along an arrangement surface for a terminal of the first battery connected to the first battery connecting portion or an arrangement surface for a terminal of the second battery connected to the second battery connecting portion and in a manner such that the second body extends along a side surface perpendicular to the arrangement surface for the terminal of the first battery or the arrangement surface for the terminal of the second battery.

With such a configuration, the fuse unit arranged around the first battery or the second battery with a space-saving design, contributes to supplying the electricity from the alternator to the first battery and the second battery with a small loss.

The fuse circuit body according to the first aspect of the present invention can supply electricity, with a small loss, from the alternator to the second battery for a starter motor additionally mounted on the vehicle to achieve idle reduction.

DETAILED DESCRIPTION

An embodiment of the present invention will be explained below with reference to the drawings.

Figure 1:
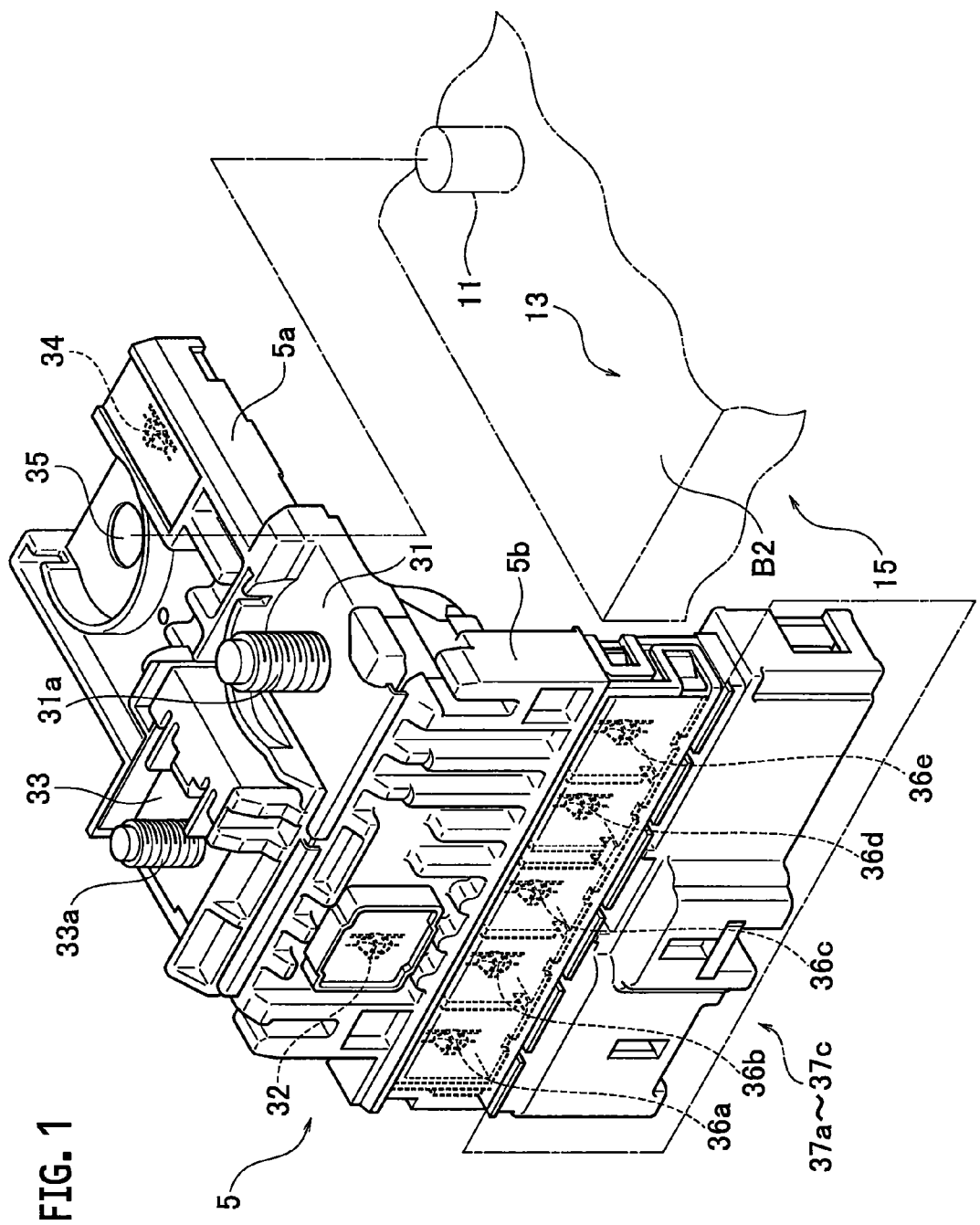
FIG. 1 is a perspective view illustrating a schematic configuration of a fuse unit including a fuse circuit body according to an embodiment.
Figure 2:
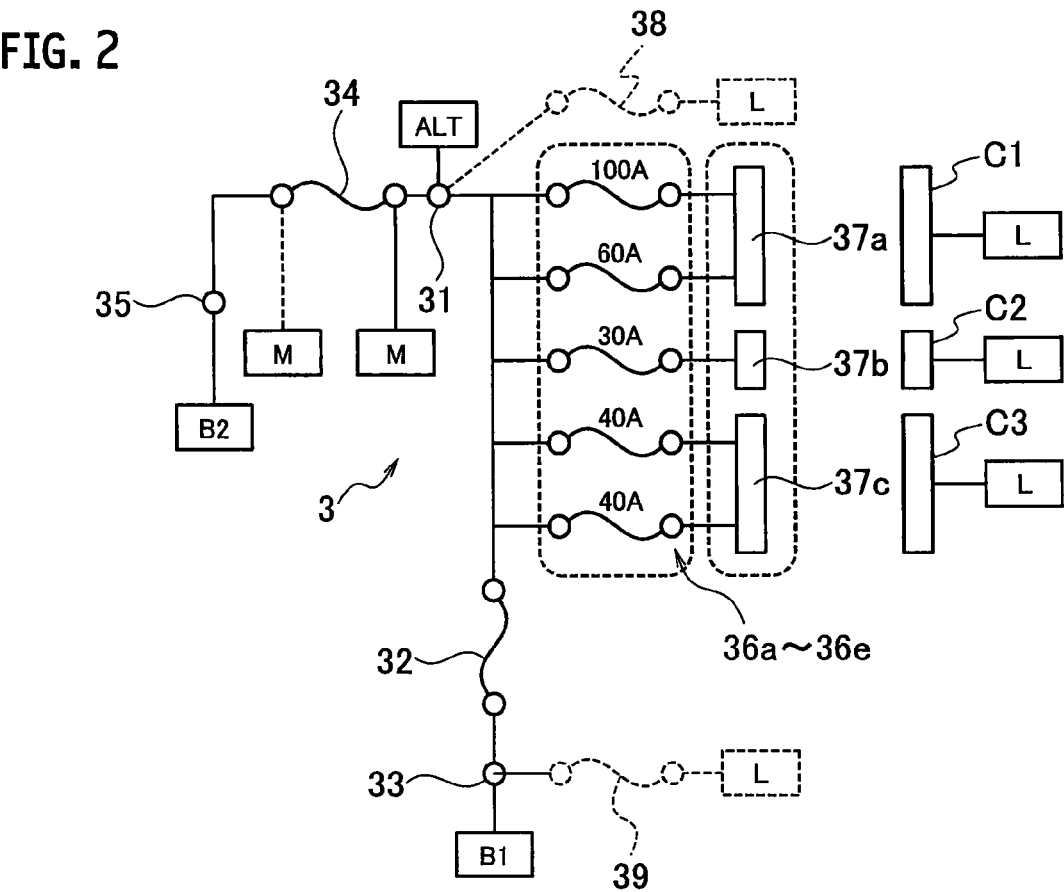
FIG. 2 is an explanatory view illustrating a circuit configuration of the fuse circuit body according to the embodiment.

A fuse unit 1 illustrated in FIG. 1 includes a fuse circuit body 3 according to the embodiment having a circuit configuration illustrated in FIG. 2. The fuse circuit body 3 includes an alternator connecting portion 31, a first battery connecting portion 33, a second battery connecting portion 35, and load connecting portions 37a to 37c.

The alternator connecting portion 31 is a terminal portion connected with an alternator ALT driven by an engine (not illustrated) on a vehicle equipped with an idle reduction function. The first battery connecting portion 33 is a terminal portion connected to the alternator connecting portion 31 via a first fusible portion (fuse) 32 and connected with a first battery B1 for supplying electricity to loads L in the vehicle.

The second battery connecting portion 35 is a terminal portion connected to the alternator connecting portion 31 via a second fusible portion (fuse) 34 and connected with a second battery B2 for supply electricity to a starter motor M used for the engine. The load connecting portions 37a to 37c are terminal portions connected to the first battery portion 33 via third fusible portions (fuses) 36a to 36e and connected with the loads L via connectors C1 to C3.

The starter motor M supplied electricity by the second battery B2 may be connected to the second fusible portion 34 on the alternator ALT side as indicated by the solid line in FIG. 2 or may be connected to the second fusible portion 34 on the second battery B2 side as indicated by the chain line in FIG. 2 depending on whether the protection of the starter motor M by the second fusible portion 34 against an overcurrent is required.

As illustrated in FIG. 1, the fuse unit 1 includes a circuit body housing 5 made of a resin serving as an insulator. The circuit body housing 5 includes a first body 5a extending along the upper surface (arrangement surface) 13 of the second battery B2 on which a positive electrode terminal (battery post) 11 is arranged, and a second body 5b extending along a side surface 15 perpendicular to the upper surface 13.

The alternator connecting portion 31, the first battery connecting portion 33, the second battery connecting portion 35, and the second fusible portion 34 in the fuse circuit body 3 are housed in the first body 5a in such a manner as to be exposed to the outside. The second body 5b houses the load connecting portions 37a to 37c in such a manner as to be exposed to a connector opening (located on the lower side in the figure) through which the connectors C1 to C3 of the loads L are inserted, and houses the respective third fusible portions 36a to 36e in such a manner as to be exposed to the outside.

The alternator connecting portion 31 is provided with a bolt 31a extending upward therefrom. The first battery connecting portion 33 is provided with a bolt 33a extending upward therefrom. A ring tongue terminal (not illustrated) of an electric cable extending from the alternator ALT is fastened to the bolt 31a of the alternator connecting portion 31 with a nut (not illustrated). A ring tongue terminal (not illustrated) of an electric cable extending from the first battery B1 is fastened to the bolt 33a of the first battery connecting portion 33 with a nut (not illustrated).

The second battery connecting portion 35 is connected with the battery post 11 of the second battery B2 via a battery terminal (not illustrated). For example, the battery terminal includes a battery post connecting portion (not illustrated) fastened onto the battery post 11, and a connecting bolt (not illustrated) inserted into a fixation hole of the second battery connecting portion 35 from the rear side thereof. The connecting bolt inserted into the fixation hole is fixed with a nut (not illustrated) attached from the front side of the second battery connecting portion 35.

In the fuse circuit body 3 according to the embodiment, as illustrated in FIG. 2, the electricity generated by the alternator ALT is supplied from the alternator connecting portion 31 to the first battery B1 via the first fusible portion 32 and the first battery connecting portion 33, and is also supplied from the alternator connecting portion 31 to the second battery B2 via the second fusible portion 34 and the second battery connecting portion 35.

Namely, in the fuse circuit body 3, the electricity from the alternator ALT is supplied to the first battery B1 only via the first fusible portion 32, and the electricity from the alternator ALT is supplied to the second battery B2 only via the second fusible portion 34. Thus, the electricity from the alternator ALT is not required to pass through two fusible portions when being supplied to the first battery B1 or the second battery B2. Accordingly, in the fuse circuit body 3, the electricity can be supplied from the alternator ALT to the first battery B1 and the second battery B2 with a small loss.

The fuse circuit body 3 is housed in the circuit body housing 5 serving as an insulator. Thus, the fuse unit 1 to be arranged around the second battery B2 with a space-saving design, contributes to supplying the electricity from the alternator ALT to the first battery B1 and the second battery B2 with a small loss.

Figure 3:
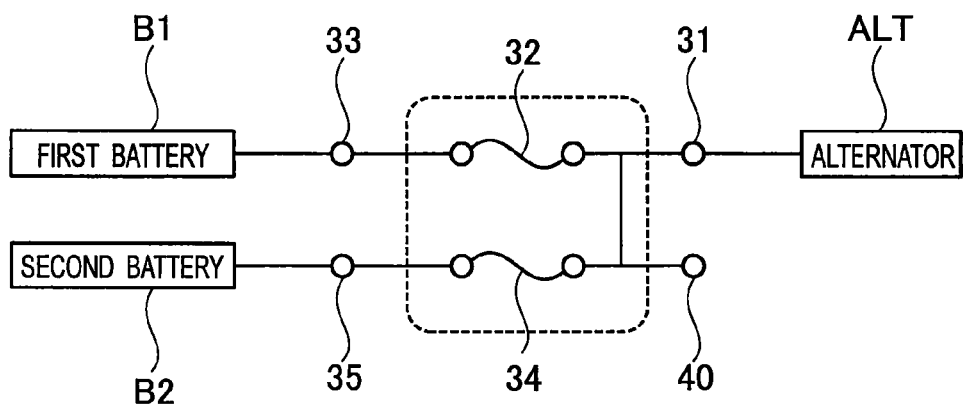
FIG. 3 is an explanatory view illustrating a circuit configuration of a modified example of the fuse circuit body according to the embodiment.

The configurations of the respective connecting portions provided in the fuse circuit body 3 are not limited to those illustrated in FIG. 2 but optional. For example, the alternator connecting portion 31 may serve concurrently as a load connecting portion connected with a load L separately via a fuse 38, and the first battery connecting portion 33 may serve concurrently as a load connecting portion connected with a load L separately via a fuse 39. Alternatively, as illustrated by a modified example illustrated in FIG. 3, an optional connecting portion 40 may be arranged toward the alternator connecting portion 31 on the side opposite to the first fusible portion 32 and the second fusible portion 34, in addition to the alternator connecting portion 31.

What is claimed is:

1. A fuse circuit body for a vehicle equipped with a first battery and a second battery each charged with electricity generated by an alternator when an engine is being driven, the first battery for supplying the electricity to a load, the second battery for supplying electricity to a starter motor for restarting the engine being stopped when the alternator is not generating electricity, the fuse circuit body comprising:
    an alternator connecting portion connected with the alternator;
    a first fusible portion connected to the alternator connecting portion;
    a first battery connecting portion connected to the alternator connecting portion via the first fusible portion, and directly connected with the first battery;
    a second fusible portion connected to the alternator connecting portion;

a second battery connecting portion connected to the alternator connecting portion via the second fusible portion, and directly connected with the second battery;

a third fusible portion connected to the first battery connecting portion;

a load connecting portion connected to the first battery connecting portion via the third fusible portion and connected with the load;

a first conducting path electrically connecting the alternator connecting portion and the first battery connecting portion via the first fusible portion; and a second conducting path electrically connecting the alternator connecting portion and the second battery connecting portion via the second fusible portion.

2. The fuse circuit body according to claim 1, further comprising a circuit body housing including:

an insulating first body housing the alternator connecting portion, the first battery connecting portion and the second battery connecting portion at least in such a manner as to be exposed outward; and an insulating second body housing the load connecting portion and the third fusible portion at least in such a manner as to be exposed outward, wherein the circuit body housing is attached to the first battery or the second battery in a manner such that the first body extends along an arrangement surface for a terminal of the first battery connected to the first battery connecting portion or an arrangement surface for a terminal of the second battery connected to the second battery connecting portion and in a manner such that the second body extends along a side surface perpendicular to the arrangement surface for the terminal of the first battery or the arrangement surface for the terminal of the second battery.

3. The fuse circuit body according to claim 1, wherein the starter motor is connected to the second fusible portion on one of: an alternator side; and a second battery side, based on whether overcurrent protection by the second fusible portion is provided for the starter motor.

4. The fuse circuit body according to claim 1, wherein the alternator connecting portion comprises a bolt extending upward therefrom.

5. The fuse circuit body according to claim 1, wherein the first battery connecting portion comprises a bolt extending upward therefrom.

6. The fuse circuit body according to claim 1, wherein the alternator supplies generated electricity from the alternator connecting portion:

to the first battery via the first fusible portion and the first battery connecting portion; and to the second battery via the second fusible portion and the second battery connecting portion.

7. The fuse circuit body according to claim 1, wherein the alternator supplies generated electricity from the alternator connecting portion:

to the first battery only via the first fusible portion and the first battery connecting portion; and to the second battery only via the second fusible portion and the second battery connecting portion.

8. The fuse circuit body according to claim 1, wherein the load connecting portion is further connected to the alternator connecting portion via the third fusible portion and to the load.

9. The fuse circuit body according to claim 8, wherein
the alternator connecting portion is connected to the load via a first separate fuse, and
the first battery connecting portion is concurrently connected to the load via a second separate fuse.

10. The fuse circuit body according to claim 1, further comprising an optional connecting portion in addition to the alternator connecting portion, the optional connecting portion arranged toward the alternator connecting portion on a side of the fuse circuit body opposite to the first fusible portion and the second fusible portion.

11. A fuse circuit body for a vehicle equipped with a first battery and a second battery each charged with electricity generated by an alternator when an engine is being driven, the first battery for supplying the electricity to a load, the second battery for supplying electricity to a starter motor for restarting the engine being stopped when the alternator is not generating electricity, the fuse circuit body comprising:

an alternator connecting portion connected with the alternator;

a first fusible portion connected to the alternator connecting portion;

a first battery connecting portion connected to the alternator connecting portion via the first fusible portion and connected with the first battery;

a second fusible portion connected to the alternator connecting portion;

a second battery connecting portion connected to the alternator connecting portion via the second fusible portion and connected with the second battery;

a third fusible portion connected to the first battery connecting portion;

a load connecting portion connected to the first battery connecting portion via the third fusible portion and connected with the load;

a circuit body housing including:

an insulating first body housing the alternator connecting portion, the first battery connecting portion and the second battery connecting portion at least in such a manner as to be exposed outward; and an insulating second body housing the load connecting portion and the third fusible portion at least in such a manner as to be exposed outward, wherein the circuit body housing is attached to the first battery or the second battery in a manner such that the first body extends along an arrangement surface for a terminal of the first battery connected to the first battery connecting portion or an arrangement surface for a terminal of the second battery connected to the second battery connecting portion and in a manner such that the second body extends along a side surface perpendicular to the arrangement surface for the terminal of the first battery or the arrangement surface for the terminal of the second battery.

* * * * *